United States Patent
Heuver

(10) Patent No.: US 9,004,253 B2
(45) Date of Patent: Apr. 14, 2015

(54) CONTROL OF FLUID FLOW IN AN AUTOMATIC TRANSMISSION

(71) Applicant: Ford Global Technologies, LLC, Dearborn, MI (US)

(72) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 13/927,150

(22) Filed: Jun. 26, 2013

(65) Prior Publication Data

US 2015/0001026 A1   Jan. 1, 2015

(51) Int. Cl.
*F16D 13/74* (2006.01)
*F16H 25/08* (2006.01)

(52) U.S. Cl.
CPC ........... *F16H 25/08* (2013.01); *Y10T 74/18296* (2015.01); *F16D 13/74* (2013.01)

(58) Field of Classification Search
CPC .......... F16H 2300/0214; F16K 31/521; F16K 31/524; F16K 31/52441; F16K 31/52475
USPC ............................. 192/113.32, 113.35; 184/34
See application file for complete search history.

(56) References Cited

U.S. PATENT DOCUMENTS

| | | | |
|---|---|---|---|
| 2,444,495 A * | 7/1948 | Chase | 74/568 R |
| 3,105,582 A | 10/1963 | Ziabicki | |
| 3,351,169 A | 11/1967 | McIndoe | |
| 3,586,134 A * | 6/1971 | Westfall | 188/71.6 |
| 3,773,157 A | 11/1973 | Koch, Jr. et al. | |
| 3,823,801 A * | 7/1974 | Arnold | 192/48.618 |
| 3,834,503 A | 9/1974 | Maurer et al. | |
| 4,108,290 A | 8/1978 | Fisher | |
| 4,142,619 A | 3/1979 | Spokas | |
| 4,205,739 A | 6/1980 | Shelby et al. | |
| 4,321,990 A | 3/1982 | Koch, Jr. | |
| 4,458,793 A | 7/1984 | Riese et al. | |
| 4,544,055 A | 10/1985 | Kronstadt | |
| 4,751,989 A | 6/1988 | Shinokawa et al. | |
| 5,799,763 A | 9/1998 | Dehrmann | |
| 5,819,896 A | 10/1998 | Fallu | |
| 5,988,335 A | 11/1999 | Kupferschmid et al. | |
| 6,006,778 A * | 12/1999 | Kim | 137/242 |
| 6,006,881 A * | 12/1999 | Lederman et al. | 192/45.014 |
| 6,244,407 B1 | 6/2001 | Kremer et al. | |
| 6,443,289 B1 * | 9/2002 | Sagae et al. | 192/113.32 |
| 6,840,363 B2 | 1/2005 | Braford, Jr. et al. | |
| 6,851,532 B2 | 2/2005 | Back et al. | |
| 2010/0274456 A1 | 10/2010 | Kondo et al. | |
| 2012/0247911 A1 | 10/2012 | Noda et al. | |

* cited by examiner

*Primary Examiner* — Rodney H Bonck

(74) *Attorney, Agent, or Firm* — James Dottavio; MacMillan, Sobanski & Todd, LLC

(57) ABSTRACT

A flow control assembly for an automatic transmission includes a valve for opening and closing communication with a source of pressurized fluid and a rotatable cam secured to a member, contact between the cam and a plunger of the valve causing said communication to open, absence of contact between the cam and the plunger causing said communication to close.

10 Claims, 4 Drawing Sheets

CONTROL OF FLUID FLOW IN AN AUTOMATIC TRANSMISSION

BACKGROUND OF THE INVENTION

1. Field of the Invention

This invention relates generally to controlling hydraulic fluid flow that lubricates a rotating clutch and discontinues the flow when the clutch is not rotating.

2. Description of the Prior Art

In an automatic transmission certain control elements, such as hydraulically-actuated clutches, are engaged and rotating only during operation in a few speed ratios and are non-rotating in the other speed ratios. When rotating they must be supplied with hydraulic lubricant at a flow rate of approximately 0.7 liters/minute. But if the flow rate is continuous during period of their non-rotation, energy is wasted and required pumping capacity is unnecessarily higher. Reducing pump flow demand improves fuel economy.

Furthermore, supplying oil flow to the clutch when it is stationary causes oil puddling, which can cause stick-slip performance problems.

A need exists in the industry for a technique that provides lubricant flow to such clutches only during periods of non-rotation without requiring computer-control or a need for an electronic solenoid for actuation.

SUMMARY OF THE INVENTION

A flow control assembly for an automatic transmission includes a valve for opening and closing communication with a source of pressurized fluid and a rotatable cam secured to a member, contact between the cam and a plunger of the valve causing said communication to open, absence of contact between the cam and the plunger causing said communication to close.

The flow control assembly is completely self-contained in the plunger, spring, and cam, and requires no computer-controlled actuation. It provides oil flow when needed, and shuts off flow when it is not needed, thereby enhancing fuel economy.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
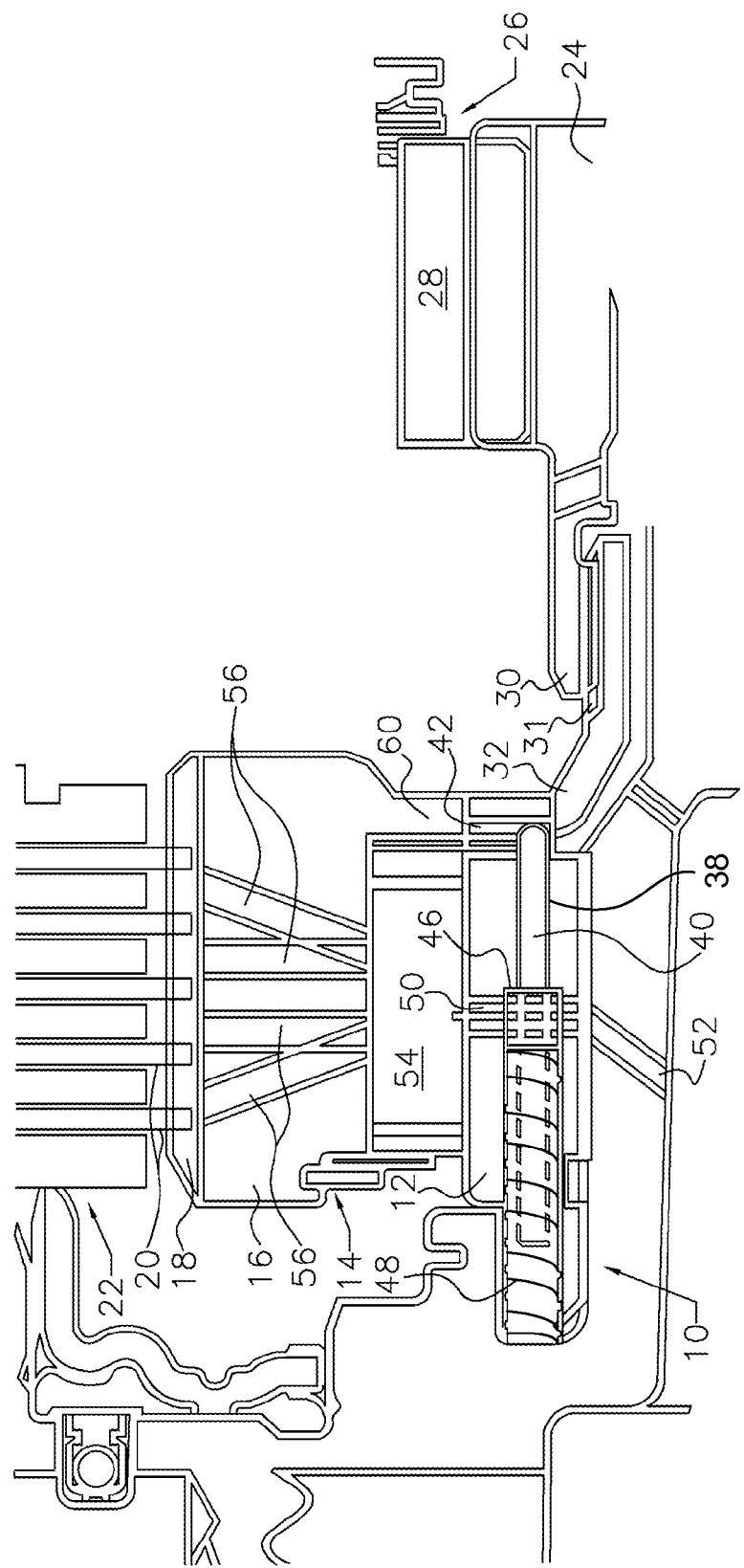
FIG. 1 is a schematic diagram of a portion of an automatic transmission showing a lube cut-off valve that is actuated by rotation of the race of a OWC.

FIG. 1 shows a lube cut-off valve 10 located in the inner race 12 of a OWC 14, whose outer race 16 is formed with an axial spline 18, which is engaged by the discs 20 of a friction clutch 22. OWC 14 produces a one-way drive connection between the inner and outer races 12, 16.

The sun gear 24 of a planetary gearset 26 meshes with a set of planet pinions 28. Sun gear 24 includes an arm 30 that extends axially and is formed with an internal axial spline, which is continually engaged with an external spline 31 formed on an arm 32 secured to outer race 16 of OWC 14.

The cut-off valve 10 includes a cylinder 38; a plunger 40, located in the cylinder 38 and contacting a cam 42 on the OWC outer race 16; head 46 formed on the plunger 40; and a coiled, helical spring 48, which contacts the head 46 and continually urges the plunger 40 into contact with the cam 42, the position shown in FIG. 1.

The inner race 12 of OWC 14 is formed with a radial passage 50, which communicates with a source of automatic transmission fluid (ATF) through a passage 52. The ATF flows radial from inner race 12, around torque transmitting members 54, such as rockers or rollers 54, of the OWC 14 and through passages 56 in the outer race 16 to lubricate the discs 20 of friction clutch 22.

The cut-off valve 10 shuts-off lube flow when OWC 14 and friction clutch 22 are stationary, i.e., not rotating, and allows ATF to flow through passages 52, 50 and 56 when OWC 14 and friction clutch 22 are rotating.

Figure 2:
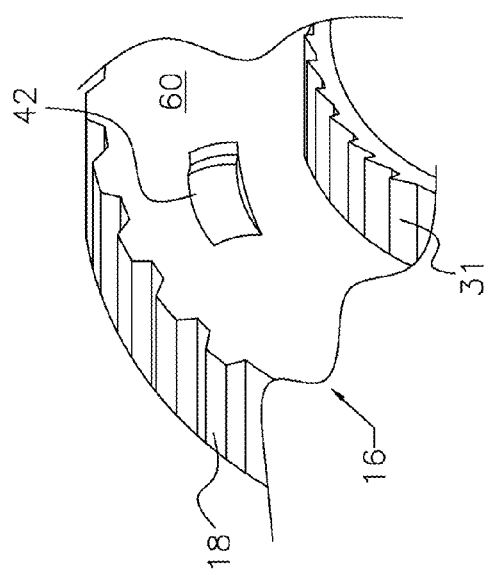
FIG. 2 is side perspective view of the outer race of the OWC.
Figure 3:
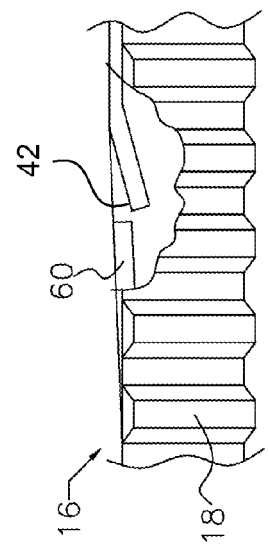
FIG. 3 is a top view of a portion of the outer race.

As FIGS. 2 and 3 show the outer race 16 includes a side wall 60, which connects external splines 18 and 31. A tab is pierced through side wall 60 and bent axially inward to form the cam 42, which is located in radial alignment with plunger 40.

Preferably the outer race 16 is formed with three such cams 42, each being mutually spaced at substantial equal angular intervals. Similarly multiple cut-off valves 10 are mutually spaced at substantial equal angular intervals about the axis of rotation.

Figure 4:
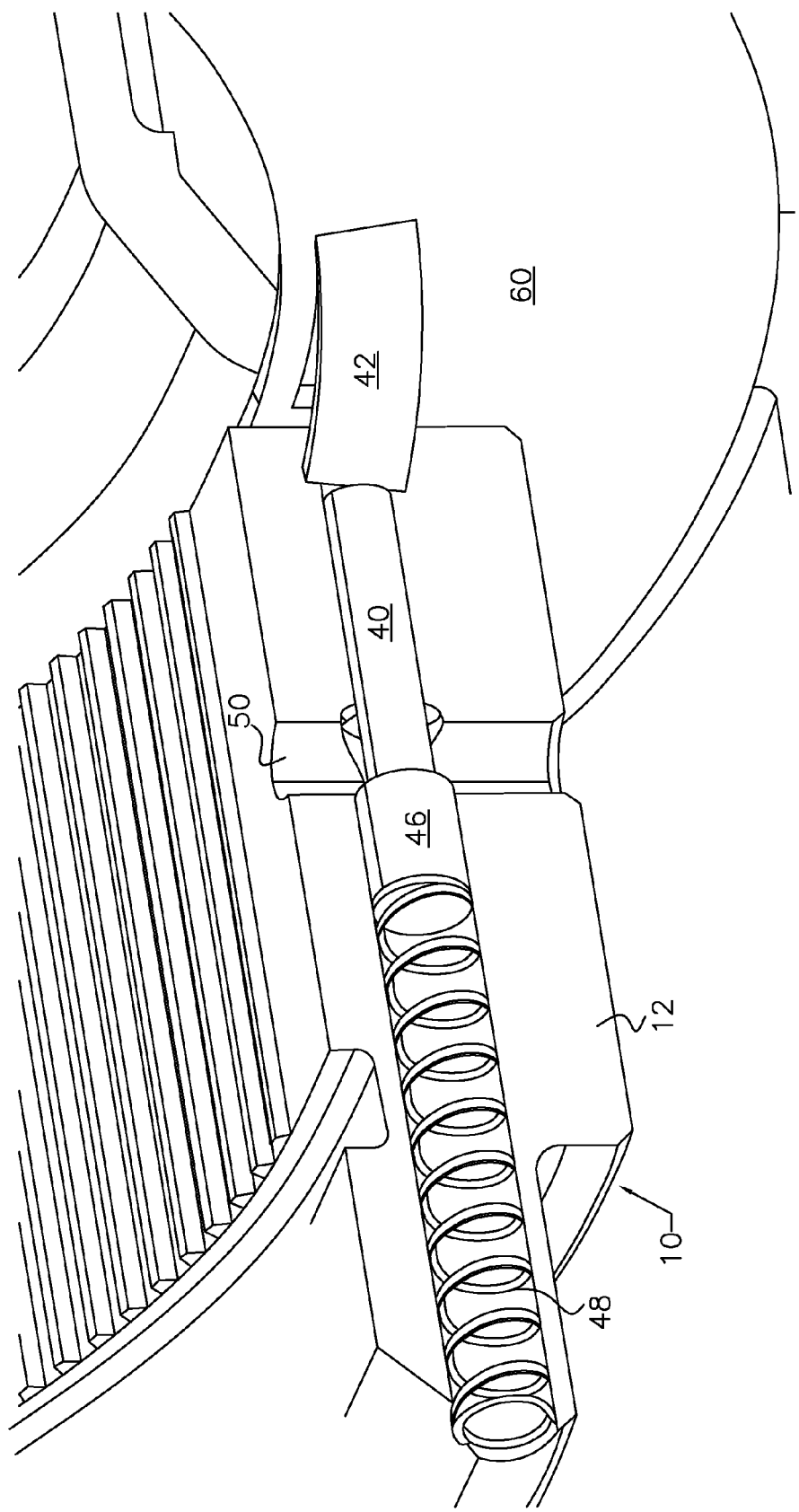
FIG. 4 is a side perspective view showing the cut-off valve open.
Figure 5:
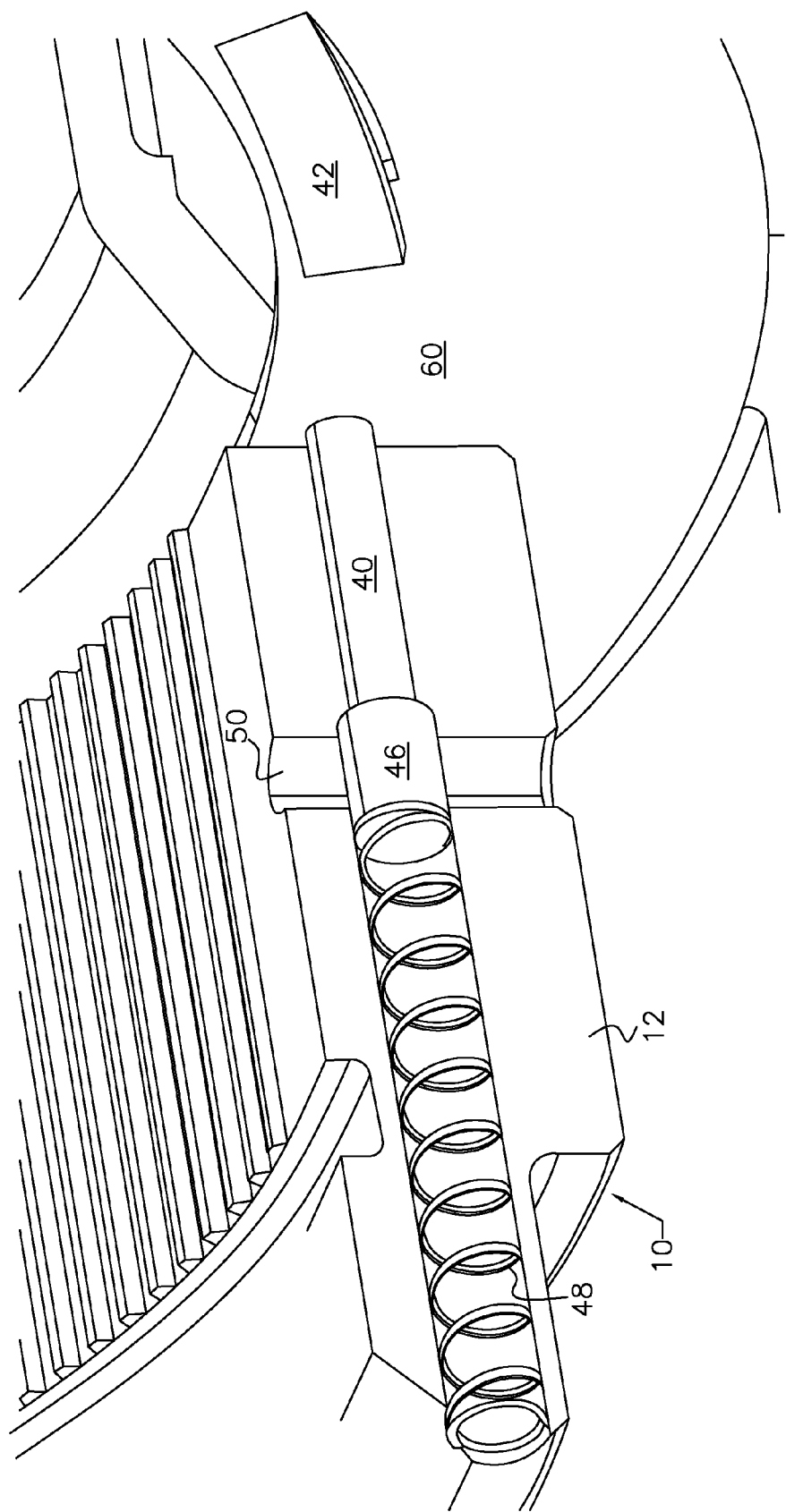
FIG. 5 is a side perspective view showing the cut-off valve closed.

As the outer race 16 rotates about its central axis, each cam 42 also rotates such that it alternately engages and disengages each of the plungers 40. When a plunger 40 contacts one of the cams 42, the head 46 is displaces axially leftward, thereby opening communication between passages 52 and 50, as FIG. 4 shows. When a plunger 40 is out of contact with the cams 42, the head 46 is displaced axially rightward from the position of FIG. 4, to the position of FIGS. 1 and 5, wherein communication between passages 52 and 50 is closed.

The cut-off valve 10 includes one or more simple cam-actuated, spring-returned plungers 40, which, when depressed by contact between the plunger 40 and the cam 42, allows lube oil to flow to the OWC 14 and the discs 20 of the friction clutch 22. By selecting the spring rate of spring 48 and the profile of cam 42, flow of lube oil can be turned on continuously after a specified rotational speed is reached. When the OWC 14 is stationary there is a high likelihood that the plunger (or plungers) 40 is/are out of contact with the ramp(s) of cam(s) 42 and that oil flow is stopped.

The number of cams 42, the spring rate, and the diameter of passage 50 can be sized such that the desired lube flow rate occurs when the outer race 16 is rotating and that flow stops when the outer race is stationary.

In accordance with the provisions of the patent statutes, the preferred embodiment has been described. However, it should be noted that the alternate embodiments can be practiced otherwise than as specifically illustrated and described.

The invention claimed is:

1. A flow control assembly for an automatic transmission, comprising:
   a valve for opening and closing communication to a source of pressurized fluid;
   a rotatable cam secured to a member, contact between the cam and a plunger of the valve causing said communication to open, absence of contact between the cam and the plunger causing said communication to close; and
   wherein the cam is secured to a first race of a one-way transmission control member; and the valve is supported on a second race of the one-way transmission control member.

2. The assembly of claim 1, further comprising a spring for continually urging the plunger toward the cam.

3. The assembly of claim 1, wherein the valve further includes:
   a first passage formed in a second member that supports the valve;
   a head secured to the plunger for opening and closing the first passage; and
   a spring urging the plunger into contact with the cam.

4. The assembly of claim 1, further comprising:
   a first passage formed in the second race and communicating with the source of pressurized fluid;
   discs of a transmission friction control element secured for rotation to the first race; and
   a second passage formed in the second race, fluid flow around torque transmitting elements of the one-way transmission control member providing communication between the first passage and the second passage.

5. A flow control assembly for an automatic transmission, comprising:
   a rotatable cam secured to a first race of a one-way transmission control member; and
   a valve including a plunger supported on a second race of said control member, for opening and closing communication with a source of pressurized fluid, contact between the cam and a plunger causing said communication to open, absence of contact between the cam and the plunger causing said communication to close.

6. The assembly of claim 5, further comprising a spring for continually urging the plunger toward the cam.

7. The assembly of claim 5, wherein the valve further includes:
   a first passage formed in the second race;
   a head secured to the plunger for opening and closing the first passage; and
   a spring urging the plunger into contact with the cam.

8. The assembly of claim 5, further comprising:
   a first passage formed in the second race and communicating with the source of pressurized fluid;
   discs of a transmission friction control element secured for rotation to the first race; and
   a second passage formed in the first race, fluid flow around torque transmitting elements located between the first and second races providing communication between the first passage and the second passage.

9. A flow control assembly for an automatic transmission, comprising:
   a first race including first passage and a cam;
   a second race including a second passage communicating with a source of pressurized fluid, a plunger that opens and closes the second passage, a spring for urging the plunger toward the cam, contact between the plunger and the cam causing the plunger to open communication through the second passage, absence of said contact causing the plunger to prevent communication through the second passage; and
   at least one disc of a transmission friction control element secured for rotation to the first race and located at an opening of the first passage;
   torque transmitting elements located between the first race and the second race, fluid flow around said torque transmitting elements providing communication between the fluid source and the at least one disc through the first passage and the second passage.

10. The assembly of claim 9, wherein the cam is secured to the first race.

* * * * *